United States Patent Office 3,316,246
Patented Apr. 25, 1967

3,316,246
MORPHANTHRIDINE CARBOXYLIC ACID
AND DERIVATIVES
Alexander E. Drukker, Milwaukee, and Claude I. Judd, Mequon, Wis., assignors to Colgate-Palmolive Company, New York, N.Y., a corporation of Delaware
No Drawing. Filed Feb. 8, 1966, Ser. No. 525,869
6 Claims. (Cl. 260—239)

This is a continuation-in-part of application Ser. No. 438,383, filed Mar. 9, 1965.

This invention relates to novel morphanthridine derivatives and processes of preparing such derivatives. More particularly, this invention is concerned with morphanthridine-11-carboxylic acid and its derivatives, novel intermediates associated with the preparation of these compounds, processes of producing the intermediates and final compounds and pharmacologic and therapeutic uses for such compounds.

The novel compounds of this invention have the formula

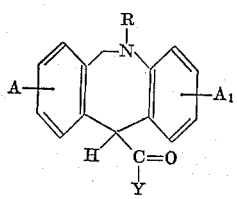

wherein A and $A_1$ are hydrogen, a halo group such as the chloro and bromo, a lower alkoxy such as methoxy and ethoxy, a lower alkyl such as methyl and butyl, a lower alkyl-thio such as thiomethyl and thioethyl and trifluoromethyl; R is hydrogen, a straight or branched chain lower alkyl of from 1 to 8 carbon atoms such as methyl, ethyl, isopropyl and butyl, an aralkyl such as benzyl or alkyl; and Y is a member selected from the class consisting of —OH, —OCH$_2$CN and the group

wherein $R_2$ and $R_3$ are the same or different groups including hydrogen, a lower alkyl such as methyl, ethyl, propyl, isopropyl or butyl, a lower alkenyl such as allyl, an aryl such as phenyl or a nuclear-substituted phenyl, an aralkyl such as benzyl, phenethyl, phenylisopropyl, diphenylmethyl, trityl, naphthylmethyl, a cycloalkyl, particularly cycloalkyl groups having from 5 to 7 carbon atoms such as cyclopentyl, cyclohexyl, a cycloalkyl-lower alkyl such as cyclohexyl-methyl or cyclopentyl-ethyl and groups in which

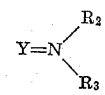

represents a group such as morpholino, pyrrolidino, piperidino, piperazino, 1,2,3,4 - tetrahydroquinolino, 4-lower alkyl piperazino such as 4-methylpiperazino, 4-(phenyl-lower alkyl)-piperzino such s 4-benzyl-piperazino and 4-(alpha-methylphenethyl)-piperazino and 4 - (hydroxy-lower alkyl)-piperazino such as 4-(2-hydroxy-1-ethyl)piperazino.

The compounds of the present invention may be prepared by treating a 5-substituted-5,6-dihydromorphanthridine with an alkali metal alkyl or aryl compound to form the 11-alkali metal salt and then carbonating said compound to form the corresponding novel carboxylic acid (i.e., those compounds in which Y is OH). The acid can then be converted to the cyano methyl ester (i.e., those compounds in which Y is —OCH$_2$CN). The esters in turn can be treated with amines to form the amides—i.e., those compounds in which

The process may be represented as follows:

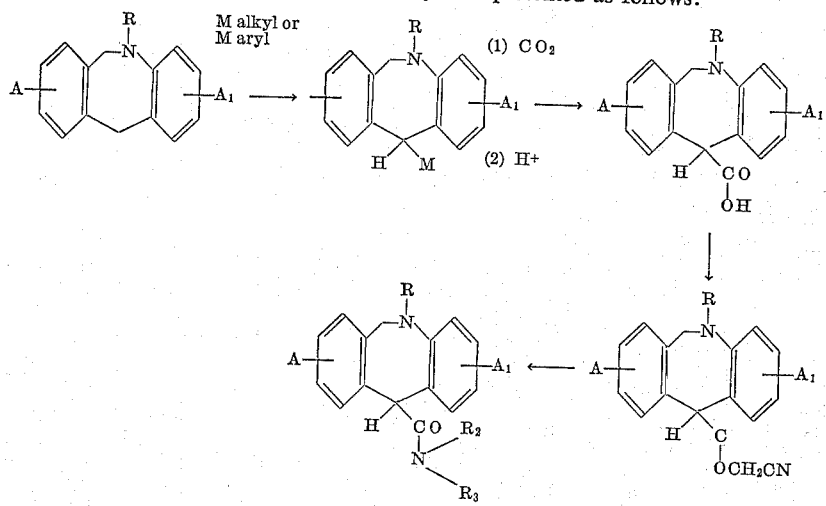

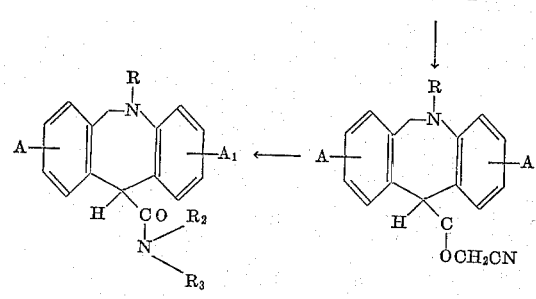

wherein A, $A_1$, R, and

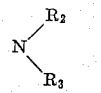

have their assigned values and M is an alkali metal such as lithium.

The 11-alkali metal salts of 5-substituted-5,6-dihydromorphanthridine which may be used in the process are prepared by reacting a 5-substituted 5,6-dihydromorphanthridine with an alkali metal lower alkyl or aryl compound such as butyl lithium or phenyl lithium. The reaction is readily effected by bringing the reactants together in an inert anhydrous liquid reaction medium such as pentane, hexane, ethyl ether, xylene, toluene, tetralin, cumene or tetrahydrofuran, and compatible mixtures of such solvents. The reaction can be effected at room temperature or elevated temperatures depending on the reactivity of the alkali metal compound used in the process. The reaction is usually substantially complete in 1 to 4 hours. Following termination of the reaction the product can be isolated, if desired, but this is ordinarily not done since it may be used as present in the reaction mixture.

Some of the 11-alkali metal salts of 5-substituted-5,6-dihydromorphanthridines which may be produced as described are the 11-lithium salts of 5-methyl-5,6-dihydromorphanthridine,
5-ethyl-5,6-dihydromorphanthridine,
5-isopropyl-5,6-dihydromorphanthridine,
5-benzyl-5,6-dihydromorphanthridine,
5-phenethyl-5,6-dihydromorphanthridine,
5-allyl-5,6-dihydromorphanthridine, and
5-cinnamyl-5,6-dihydromorphanthridine.

The conversion of the 11-alkali metal salt of a 5-substituted-5,6-dihydromorphanthridine to the corresponding carboxylic acid is effected by a carbonation procedure. The 11-alkali metal salt is dissolved in an inert anhydrous liquid reaction medium and the solution is treated with a large excess of solid carbon dioxide. The excess carbon dioxide is allowed to evaporate and the residue is treated with a dilute alkali metal carbonate solution, preferably dilute potassium carbonate solution. The aqueous layer which forms is then separated, acidified to a pH of about 2 to 3 with an acid such as hydrochloric acid, and extracted with a suitable solvent such as benzene. The benzene fraction is then concentrated to yield the crude acid and, if desired, the acid further purified by crystallization from a suitable solvent, e.g. petroleum ether-methanol.

Some of the novel carboxylic acids which may be prepared in this manner are the following:

5-methyl-5,6-dihydromorphanthridine 11-carboxylic acid,
5-isopropyl-5,6-dihydromorphanthridine 11-carboxylic acid,
5-butyl-5,6-dihydromorphanthridine 11-carboxylic acid,
5-benzyl-5,6-dihydromorphanthridine 11-carboxylic acid, and
5-phenethyl-5,6-dihydromorphanthridine 11-carboxylic acid.

The 5-substituted-5,6-dihydromorphanthridine 11-carboxylic acid may be readily converted to the corresponding cyanomethyl ester by treating the acid with a haloacetonitrile such as chloroacetonitrile or bromoacetonitrile in an inert solvent, preferably in the presence of a hydrogen halide acceptor, e.g. triethylamine. The reaction is promoted by heating, and reflux temperatures are preferred. When the reaction is substantially complete the corresponding cyanomethyl ester can be recovered from the reaction mixture by conventional techniques, e.g., solvent extraction followed by crystallization procedures.

Some of the 5-substituted-5,6-dihydromorphanthridine-11-carboxylate cyanomethyl esters which may be prepared in this manner are the following:

cyanomethyl 5-methyl-5,6-dihydromorphanthridine-11-carboxylate,
cyanomethyl 5-isopropyl-5,6-dihydromorphanthridine-11-carboxylate,
cyanomethyl 5-butyl-5,6-dihydromorphanthridine-11-carboxylate,
cyanomethyl 5-benzyl-5,6-dihydromorphanthridine-11-carboxylate, and
cyanomethyl 5-phenethyl-5,6-dihydromorphanthridine-11-carboxylate.

The 5-substituted-5,6-dihydromorphanthridine carboxamides, those compounds in which

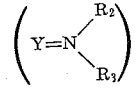

may be readily prepared by treating a corresponding 11-carboxylate cyanomethyl ester derivative with ammonia or a suitable primary or secondary amine.

Representative of the amines which may be employed in the process of the present invention are the following:

methylamine,
ethylamine,
benzylamine,
dimethylamine,
methylbenzylamine,
aniline,
piperidine,
4-substituted piperazine, and
morpholine.

Representative of the novel amides which can be prepared by the process of the present invention are the following:

5-methyl-5,6-dihydromorphanthridine-11-carboxamide,
N-methyl-5-methyl-5,6-dihydromorphanthridine-11-carboxamide,
N,N-dimethyl-5-methyl-5,6-dihydromorphanthridine-11-carboxamide,
N-benzyl-5-methyl-5,6-dihydromorphanthridine-11-carboxamide,
N-phenyl-5-methyl-5,6-dihydromorphanthridine-11-carboxamide,
N-methyl-N-benzyl-5-methyl-5,6-dihydromorphanthridine-11-carboxamide,
N-(5-methyl-5,6-dihydro-11-morphanthridinecarbonyl)-piperidine,
N-(5-methyl-5,6-dihydro-11-morphanthridinecarbonyl) morpholine, and
4-methyl-1-(5-methyl-5,6-dihydro-11-morphanthridinecarbonyl)-piperazine.

While all the compounds of the invention are useful as chemical and pharmaceutical intermediates, the novel compounds of the present invention which are amides

are, in addition, promising analgetic, sedative, skeletal muscle relaxants, anticonvulsant agents and general central nervous system depressants. Therfore, they can be used in pharmacological studies and as screening agents for evaluating compounds for these activities.

The compounds can be administered to animals as pure compounds, in the form of a pharmaceutically acceptable non-toxic acid addition salt, but to obtain a more practical size to dosage relationship one or more of the compounds is combined with a suitable pharmaceutical carrier and made into unit-dosage forms. Administration can be oral or parenteral.

Pharmaceutical carriers which are liquid or solid can be used. The preferred liquid carrier is water. Flavoring materials can be included in the solutions as desired.

Solid pharmaceutical carriers such as starch, sugar and talc can be used to form powders. The powders can be used as such or be tableted, or be used to fill gelatin capsules. Suitable lubricants like magnesium stearate, binders such as gelatin and disintegrating agents, like sodium carbonate in combination with citric acid, can be used to form the tablets.

Unit dosage forms such as tablets and capsules can contain any suitable predetermined amount of one or more of the compounds and can be administered one or more at a time at regular intervals. Such unit dosage forms can contain 1 to 300 mg. or more of an active compound of this invention. The total amount of active compound administered must be ultimately fixed by reference to the animal and disease to be treated. However, about 1 to 300 mg. four times daily for a total daily dose of 4 to 1200 mg. is suitable.

The following examples are presented to illustrate the invention:

EXAMPLE I

*5-methyl-5,6-dihydromorphanthridine-11-carboxylic acid*

To a solution of 41.8 g. (0.2 mole) of 5-methyl-5,6-dihydromorphanthridine in 250 ml. of tetrahydrofuran is added dropwise at 10° a solution of 166 ml. of butyl lithium solution (0.25 mole) in 250 ml. of ether. The resulting dark-red solution is stirred 5 hours at room temperature and poured into a large excess of solid carbon dioxide in 1 l. of ether. The excess of carbon dioxide is left to evaporate, and the residue is treated with dilute potassium carbonate solution. The aqueous layer is separated, acidified with hydrochloric acid to pH 2–3, and extracted with benzene. The benzene solution is dried over sodium sulfate, filtered, and concentrated. The solid residue is recrystallized from 750 ml. of petroleum ether and 125 ml. of methanol to give 5-methyl-5,6-dihydromorphanthridine 11-carboxylic acid, M.P. 130° (decomposed).

*Analysis.*—Calcd. for $C_{16}H_{15}NO_2$: C, 75.87; H, 5.97; N, 5.53. Found: C, 75.91; H, 5.86; N, 5.80.

EXAMPLE II

*Cyanomethyl 5-methyl-5,6-dihydromorphanthridine-11-carboxylate*

To 14.05 g. (0.059 mole) of 5-methyl-5,6-dihydromorphanthridine 11-carboxylic acid and 6.6 g. of triethylamine in 200 ml. of ethyl acetate is added dropwise with stirring 4.9 g. of chloroacetonitrile in 100 ml. of ethyl acetate. The solution is refluxed for 6 hours, concentrated, the residue is dissolved in benzene, washed with water, dried over potassium carbonate, filtered, and concentrated. The solid residue is recrystallized from ethanol to give cyanomethyl 5-methyl-5,6-dihydromorphanthridine-11-carboxylate, M.P. 184.5°.

*Analysis.*—Calcd. for $C_{18}H_{16}N_2O_2$: C, 73.95; H, 5.51; N, 9.58. Found: C, 73.47; H, 5.35; N, 9.50.

EXAMPLE III

*5-methyl-5,6-dihydromorphanthridine-11-carboxamide*

A mixture of 7.2 g. (0.0246 mole) of cyanomethyl 5-methyl-5,6-dihydromorphanthridine-11-carboxylate and 150 ml. of liquid ammonia are stirred in an autoclave for 18 hours. The autoclave is opened and the ammonia is evaporated at room temperature. The residue is taken up in 200 ml. of ethanol, boiled to remove the ammonium cyanide, filtered and concentrated. The residue is recrystallized from 35 ml. of acetonitrile to give 5-methyl-5,6-dihydromorphanthridine-11-carboxamide, M.P. 146–147°.

*Analysis.*—Calcd. for $C_6H_{16}N_2O$: C, 76.16; H, 6.39; N, 11.10. Found: C, 76.32; H, 6.46; N, 11.01.

EXAMPLE IV

*5-benzyl-5,6-dihydromorphanthridine-11-carboxylic acid*

To a solution of 127.3 g. (0.465 mole) of 5-benzyl-5,6-dihydromorphanthridine in 550 ml. of tetrahydrofuran is added dropwise with slight cooling 341 ml. (0.52 mole) of butyl lithium solution in 550 ml. of ether. The dark colored solution is stirred for 5 hours at room temperature, and poured onto an excess of carbon dioxide in ether. The residual mixture of solid and ether is treated with dilute potassium carbonate. The aqueous layer is acidified with hydrochloric acid until pH=2, and the resulting product extracted with benzene, dried over sodium sulfate, filtered and concentrated. The residue is recrystallized from 1400 ml. of a benzene-n-heptane (1:1) mixture to yield 5-benzyl-5,6-dihydromorphanthridine-11-carboxylic acid, M.P. 149–150°. Repeated crystallizations raised the melting point to 155–156°.

*Analysis*—Calcd. for $C_{22}H_{19}NO_2$: C, 80.22; H, 5.81; N, 4.25. Found: C, 80.12; H, 5.75; N, 4.22.

EXAMPLE V

*Cyanomethyl 5-benzyl-5,6-dihydromorphanthridine-11-carboxylate*

A mixture of 67.5 g. (0.205 mole) of 5-benzyl-5,6-dihydromorphanthridine-11-carboxylic acid, 22.8 g. (0.226 mole) of triethylamine, and 250 ml. of chloroacetonitrile is heated 25 minutes in a 130° oil bath. After cooling, the liquid is poured into 1 liter of water, extracted with carbontetrachloride, washed with water, and concentrated to yield 107.5 g. of residue, which is recrystallized from 400 ml. of ethanol to afford cyanomethyl 5-benzyl-5,6-dihydromorphanthridine-11-carboxylate, M.P. 126–128°.

*Analysis.*—Calcd. for $C_{24}H_{20}N_2O_2$: C, 78.23; H, 5.47; N, 7.60. Found: C, 78.49; H, 5.50; N, 7.63.

EXAMPLE VI

*5-benzyl-5,6-dihydromorphanthridine-11-carboxamide*

An autoclave is charged with 27.6 g. (0.075 mole) of cyanomethyl 5-benzyl-5,6-dihydromorphanthridine-11-carboxylate and 100 ml. of liquid ammonia, and the mixture stirred 24 hours at room temperature. The excess of ammonia is evaporated, and the residue recrystalized from 700 ml. of ethanol to yield 5-benzyl-5,6-dihydromorphanthridine-11-carboxamide, M.P. 176°.

*Analysis.*—Calcd. for $C_{22}H_{20}N_2O$: C, 80.45; H, 6.14; N, 8.53. Found: C, 80.52; H, 6.23; N, 8.25.

EXAMPLE VII

*N-methyl-5-methyl-5,6-dihydromorphanthridine-11-carboxamide*

A mixture of 29.2 g. (0.1 mole) of cyanomethyl 5-methyl-5,6-dihydromorphanthridine-11-carboxylate and 150 ml. of liquid methylamine is heated in an autoclave for 16 hours at 50°. The methylamine is evaporated and the residue recrystallized from ethanol to yield N-methyl-5-methyl-5,6-dihydromorphanthridine-11-carboxamide, M.P. 144–145°.

*Analysis*—Calcd. for $C_{17}H_{18}N_2O$: N, 10.52. Found: N, 10.22.

EXAMPLE VIII

*4-methyl-1-(5-methyl-5,6-dihydro-11-morphanthridinecarbonyl)-piperazine*

A mixture of 29.2 g. (0.1 mole) of cyanomethyl 5-methyl-5,6-dihydromorphanthridine-11-carboxylate and 100 g. of N-methylpiperazine is stirred and heated for 24 hours in an autoclave. The reaction product is concentrated in vacuum, extracted with ether, the ethereal extract washed with water, followed by extraction with dilute hydrochloric acid. The aqueous acidic layer is basified with potassium hydroxide, the product extracted with ether, dried over carbonate, concentrated, redissolved in dry ether and dry hydrochloric acid passed in to yield 21.1 g. of a crude hydrochloride. The base is released from 9.5 g. of this hydrochloride and chromatographed over silica gel using benzene-methanol (4:1) as an eluant. A fraction of 4.35 g. of base is collected. A hydrogen maleate is formed by adding an alcoholic solution of maleic acid to an alcoholic solution of the base, followed by precipitation of the salt by addition of ether. Yield 5.12 g. (25%), M.P. 196–197°.

*Analysis.*—Calcd. for $C_{25}H_{29}N_3O_4$: C, 66.50; H, 6.48; N, 9.31. Found: C, 66.36; H, 6.39; N, 9.06.

EXAMPLE IX

*N-(5-benzyl-5,6-dihydro-11-morphanthridinecarbonyl)-pyrrolidine*

A mixture of 18.4 g. (0.05 mole) of cyanomethyl 5-benzyl-5,6-dihydromorphanthridine-11-carboxylate and 71 g. of pyrrolidine is heated 24 hours in an autoclave at 130°. The reaction mixture is concentrated, extracted with benzene, washed with dilute hydrochloric acid and water, the benzene solution is dried over potassium carbonate, filtered and concentrated to afford 17 g. of a brown syrup, which was distilled to yield N-(5-benzyl-5,6-dihydro-11-morphanthridinecarbonyl)-pyrrolidine, B.P. 250° (0.06 mm.).

*Analysis.*—Calcd. for $C_{26}H_{26}N_2O$: C, 81.65; H, 6.85; N, 7.32. Found: C, 81.62; H, 6.86; N, 7.52.

We claim:
1. A compound of the formula

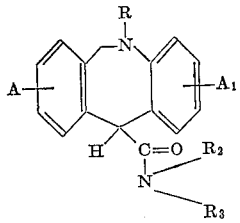

wherein A and $A_1$ are members selected from the group consisting of hydrogen, a halo group, a lower alkoxy, a lower alkyl, a lower alkyl-thio and trifluoromethyl; R is a member selected from the group consisting of hydrogen, lower alkyl, phenyl-lower alkyl and allyl, and

is selected from groups in which $R_2$ and $R_3$ are selected from hydrogen, a lower alkyl, a lower alkenyl, phenyl, phenyl-lower alkyl, diphenylmethyl, trityl, naphthymethyl, a cycloalkyl of 5 to 7 carbon atoms, a cycloalkyl-lower alkyl in which the cycloalkyl has 5 to 7 carbon atoms and groups in which

represents a member selected from a group consisting of morpholino, pyrrolidino, piperidino, piperazino, 1,2,3,4-tetrahydroquinolino, 4-lower alkyl piperazino, 4-(phenyl-lower alkyl)-piperazino and 4-(hydroxy-lower alkyl)-piperazino.

2. A compound of claim 1 in which A and $A_1$ are hydrogen and R is selected from hydrogen, lower alkyl and benzyl.

3. A compound of claim 1 in which A and $A_1$ are selected from hydrogen and halo, R is selected from hydrogen, lower alkyl and benzyl, and

is selected from morpholino, pyrrolidino, piperidino, piperazino and 4-lower alkyl piperazino.

4. A compound of claim 1 in which A and $A_1$ are selected from hydrogen and halo, R is selected from hydrogen, lower alkyl and benzyl, and $R_2$ and $R_3$ are selected from hydrogen, lower alkyl and phenyl-lower alkyl.

5. A compound of claim 1 in which A and $A_1$ are selected from hydrogen and halo, R is selected from hydrogen, lower alkyl and benzyl, and

is a group selected from 4-lower alkyl piperazino and pyrrolidino.

6. A compound of claim 1 in which A and $A_1$ are hydrogen, R is selected from methyl and benzyl, and $R_2$ and $R_3$ are hydrogen.

No references cited.

ALEX MAZEL, *Primary Examiner.*

ALTON D. ROLLINS, *Examiner.*